(12) United States Patent
Kalotay

(10) Patent No.: US 7,805,350 B2
(45) Date of Patent: Sep. 28, 2010

(54) METHOD AND A SYSTEM FOR VALUING AND ANALYZING BONDS WITH ESTATE PUT FEATURES

(75) Inventor: Andrew J. Kalotay, New York, NY (US)

(73) Assignee: Andrew Kalotay, New York, NY (US)

( * ) Notice: Subject to any disclaimer, the term of this patent is extended or adjusted under 35 U.S.C. 154(b) by 136 days.

(21) Appl. No.: 11/689,626

(22) Filed: Mar. 22, 2007

(65) Prior Publication Data

US 2007/0244836 A1 Oct. 18, 2007

Related U.S. Application Data

(60) Provisional application No. 60/785,049, filed on Mar. 22, 2006.

(51) Int. Cl.
*G06Q 40/00* (2006.01)
(52) U.S. Cl. ............... 705/36 R; 705/35; 705/36; 705/37; 705/38; 705/39; 705/40; 705/41; 705/42; 705/43; 705/44; 705/45
(58) Field of Classification Search ............. 705/35–45, 705/36 R
See application file for complete search history.

(56) References Cited

U.S. PATENT DOCUMENTS

| | | | |
|---|---|---|---|
| 4,876,648 A | 10/1989 | Lloyd | |
| 5,878,404 A | 3/1999 | Stout, Jr. et al. | |
| 5,946,668 A | 8/1999 | George | |
| 5,966,700 A | 10/1999 | Gould et al. | |
| 6,269,347 B1 | 7/2001 | Berger | |
| 6,345,262 B1 | 2/2002 | Madden | |
| 6,513,019 B2 | 1/2003 | Lewis | |
| 6,671,677 B2 | 12/2003 | May | |
| 6,788,968 B2 | 9/2004 | Pettibon | |

(Continued)

FOREIGN PATENT DOCUMENTS

WO    WO 01/84443    * 11/2001

OTHER PUBLICATIONS

Kalotay, Andrew J, Williams, George O, Fabozzi, Frank J. (1993). A model for valuing bonds and embedded options. Financial Analysts Journal, 49(3), 35.*

(Continued)

*Primary Examiner*—Charles R Kyle
*Assistant Examiner*—Robert R Niquette
(74) *Attorney, Agent, or Firm*—Foley & Lardner LLP

(57) ABSTRACT

In accordance with one aspect of the present invention, a method is disclosed for valuing at least one bond having a nominal lifetime, the bond having estate put and call options and a cash flow value. The method includes the steps of decomposing the bond into a plurality of pieces, the plurality of pieces equal to the number of years of the nominal lifetime of the bond, valuing the estate put, call option, and cash flow of each piece based on an expected mortality rate, and aggregating the estate put, call option, and cash flow values of each piece to determine an aggregate value, wherein the value of the bond is equivalent to the aggregate value. A system also is disclosed for implementing the steps of the method of the present invention to determine the value of the bond.

20 Claims, 1 Drawing Sheet

U.S. PATENT DOCUMENTS

Figure 1:
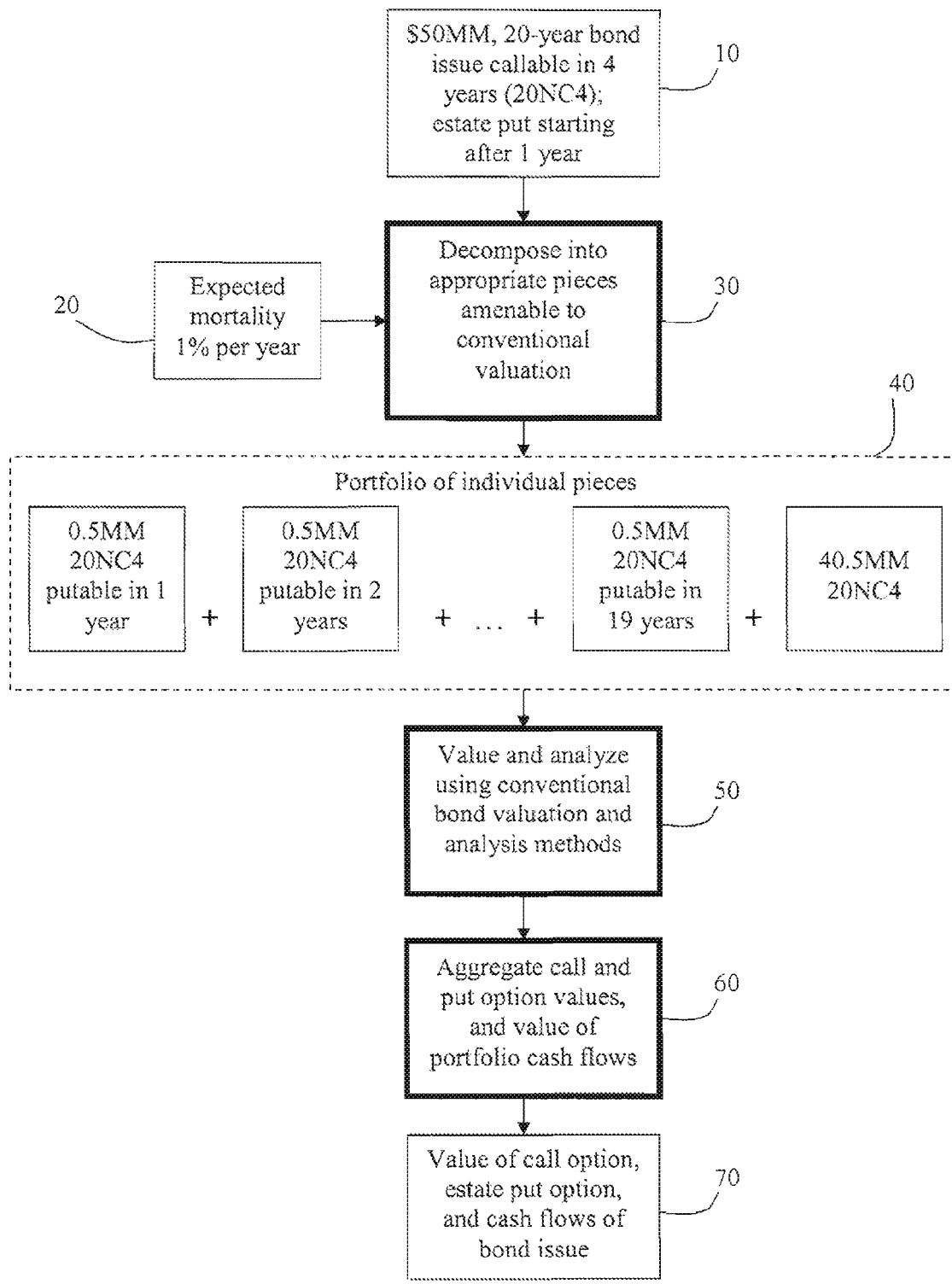

| | | | |
|---|---|---|---|
| 6,839,686 B1* | 1/2005 | Galant | 705/36 R |
| 7,089,503 B1 | 8/2006 | Bloomquist et al. | |
| 2001/0013017 A1 | 8/2001 | Berger | |
| 2002/0019805 A1 | 2/2002 | Kalotay | |
| 2002/0046158 A1 | 4/2002 | Kelly et al. | |
| 2002/0059136 A1 | 5/2002 | May | |
| 2003/0036988 A1 | 2/2003 | James | |
| 2003/0093351 A1* | 5/2003 | Sarabanchong | 705/36 |
| 2003/0182220 A1 | 9/2003 | Galant | |
| 2004/0059670 A1 | 3/2004 | Mills | |
| 2004/0064402 A1 | 4/2004 | Dreyer et al. | |
| 2004/0162734 A1 | 8/2004 | Speece et al. | |
| 2004/0167850 A1 | 8/2004 | Dreyer et al. | |
| 2004/0210502 A1* | 10/2004 | Madhavan et al. | 705/36 |
| 2005/0216384 A1* | 9/2005 | Partlow et al. | 705/35 |
| 2006/0218080 A1 | 9/2006 | Kalotay et al. | |
| 2007/0043640 A1* | 2/2007 | Broms et al. | 705/35 |
| 2007/0055603 A1 | 3/2007 | Kalotay | |
| 2007/0067233 A1* | 3/2007 | Dalal | 705/37 |
| 2007/0130041 A1* | 6/2007 | Strela et al. | 705/36 R |
| 2007/0136181 A1* | 6/2007 | Miller | 705/37 |
| 2007/0150396 A1* | 6/2007 | Rossen et al. | 705/36 R |
| 2007/0219883 A1* | 9/2007 | Bronsnick et al. | 705/35 |
| 2008/0215497 A1* | 9/2008 | Dillon | 705/36 R |

OTHER PUBLICATIONS

Kalotay, Andrew J, Williams, George O, Fabozzi, Frank J. (1993). A Model for Valuing Bonds and Embedded Options. Financial Analysts Journal, 49(3), 35.*

Kalotay, A., et al., "Ratchet Bonds: Maximum Refunding Efficiency at Minimum Transaction Cost", Journal of Applied Corp., vol. 12, pp. 40-47, Fin. 40, Bank of America, Spring 1999.

Boyce, W. M., et al., "Tax Differentials and Callable Bonds", The Journal of Finance, vol. 34, pp. 825-828, Sep. 1979.

Kalotay, A., "Agency Bonds and the Role of Bermudan Swaptions", The 10$^{th}$ Annual Fixed Income Summit, Dec. 2, 2002, Palm Beach, Florida.

"Mortgage Calculators," http://www.arcloan.com/browse.asp?altfunc=2, accessed Jan. 24, 2005 (2 pages).

"Need Mortgage Management," http://www.arcloan.com, accessed Jan. 24, 2005 (2 pages).

"Online PreQual," http://www.arcmtg.com/id.html, accessed on Jan. 24, 2005 (4 pages).

"Refinance Calculator", http://www.arcloan.com/refcalculator.asp?altfunc=2&cal=1, access on Jan. 24, 2005 (2 pages).

"Refinancing Using the Automatic Rate cut Loan," http://www/arcloan.com/browse.asp?finc=2, accessed Jan. 24, 2005 (5 pages).

Banfield, Mortgages 101-Using Option-Adjusted-Spread Analysis to Extract Prepayment Option Costs from Mortgage Yields, Sep. 21, 2004 (10 pages).

Flesaker et al., The Pricing of Firearms ("Falling Interest Rate Adjustable—Rate Mortgages"), Abstract, vol. 6, J. of Real Estate Fin. & Econ. 251 (Kluwer Academic 1993) (1 page).

Kalotay et al., "An Option-Theoretic Prepayment Model for Mortgages and Mortgage-Backed Securities," Int'l J. Theoretical & Applied Fin., Dec. 2004, vol. 7, No. 8, World Scientific, New Jersey (32 pages).

Kalotay et al., "A Model for Valuing Bonds and Embedded Options" Financial Analysts Journal, May/Jun. 1993, vol. 49, No. 3, ProQuest Central, pp. 35-46.

Ross et al., "Net Present Value", Corporate Finance, pp. 68-70.

Walkenbach, First Look: Excel 2002, http://www.pcworld.com/printable/article/id.49607/printable.html, May 31, 2001, (2 pages).

"What is an Annual Percentage Rate (APR)?", http://web.archive.org/web/*/http://www.mtg-net.com/sfaq/faq/apr.htm, Internet Archive Wayback Machine, Feb. 3, 2002 (3 pages).

Kalotay, A., "Bonds with Survivor Option as an Estate Planning Tool", CFA Institute Wealth Management 2010, Mar. 9, 2010, 22 pages, Phoenix, Arizona.

* cited by examiner

METHOD AND A SYSTEM FOR VALUING AND ANALYZING BONDS WITH ESTATE PUT FEATURES

CROSS REFERENCE TO RELATED APPLICATIONS

This claims the benefit of priority to U.S. Provisional Patent Application No. 60/785,049 filed Mar. 22, 2006 entitled "A SYSTEM AND A METHOD FOR VALUING AND ANALYZING BONDS WITH ESTATE PUT FEATURES," which is herein incorporated by reference in its entirety.

BACKGROUND OF THE INVENTION

Certain bonds sold in the retail market (i.e. to individuals rather than to institutions) carry a provision whereby, in the event of a holder's demise, the holder's estate has the right, but not the obligation, to put back the bonds to the issuer at par. This provision is also found in certificates of deposit. It is variously referred to as an estate put, a survivor option, and less delicately, a death put.

A conventional call option embedded in a bond gives to the issuer of the bond the right, but not the obligation, to redeem it prior to its maturity at a preset price. A conventional put option, on the other hand, gives the holder the right, but not the obligation, to "put back" the bond at a preset price on a preset date. Typically, the option is put back at par. The value of these conventional bond options depends on the level and volatility of interest rates.

While the theory and practice for valuing and analyzing bonds containing conventional options such as calls and puts has matured over the last couple of decades, there has hitherto been no rigorous method applied to estate puts.

Accordingly, there is a need for an accurate method and system for analyzing and valuing bonds with estate puts.

SUMMARY OF THE INVENTION

In accordance with one aspect of the present invention, a method is disclosed for valuing at least one bond having a nominal lifetime as determined by its maturity date, the bond having estate put and call options, the bond further having a cash flow value. The first step of the method is decomposing the bond into a plurality of pieces, the plurality of pieces equal to the number of years of the nominal lifetime of the bond. The second step of the method is valuing the estate put, call option, and cash flow of each piece based on an expected mortality rate. The third step of the method is aggregating the estate put, call option, and cash flow values of each piece to determine an aggregate value, wherein the value of the bond is equivalent to the aggregate value.

In accordance with another aspect of the present invention, a system is disclosed for determining the value of at least one bond having a nominal lifetime as determined by its maturity date, the bond having estate put and call options, the bond further having a cash flow value, the system including: a computer having a central processing unit; and a computer code operatively associated with the central processing unit. The computer code includes a first set of instructions configured to decompose the bond into a plurality of pieces, the plurality of pieces equal to the number of years of the nominal lifetime of the bond. Additionally, the computer code includes a second set of instructions configured to value the estate put, call option, and cash flow of each piece based on an expected mortality rate. Further, the computer code includes a third set of instructions configured to aggregate the estate put, call option, and cash flow values of each piece to determine an aggregate value, wherein the value of the bond is equivalent to the aggregate value.

DETAILED DESCRIPTION OF THE INVENTION

The present invention discloses and claims a method and system for analyzing and valuing at least one bond having a nominal lifetime, the bond having estate put and call options and a cash flow value.

The value of an estate put depends on the mortality of the holders. In addition, its value is affected by the presence of other options, typically a conventional call option.

The estate put is usually restricted in terms of the amount of principal that can be redeemed per year. For example, the estate put may be restricted to 1% of the principal that can be redeemed per year. By comparison, Certificates of Deposit (CDs) generally do not have this limitation.

Issuers and bondholders have different perspectives with regard to estate puts. From the perspective of an issuer, the mortality tables applicable to the corpus of holders affect the value of the estate put. From the perspective of an individual holder, the individual's expected life (represented by a probabilistic mortality table) is the relevant factor. Both issuers' and bondholders' perspectives also may be affected by taxes.

Issuers who ignore the proper valuation and analysis of bonds with estate puts do so at their detriment as these bonds can be put back when interest rates are higher than at the time the bonds were issued.

In addition, hedging the cash flows of such bonds by the use of swaps without taking the estate put provisions into account may cause some ineffectiveness in the hedge.

Because the coupon on bonds with an estate put feature is typically lower than the coupon on those without one, ceteris paribus, investors would make better investment decisions if they could determine whether the acquired option is worth the reduction in interest. For example, a young investor would have little incentive to forgo interest in exchange for a "death put," while an elderly investor is likely to find it a good deal.

The present invention therefore discloses and claims the following method and system for quantifying and analyzing the cost and benefit of estate puts.

In order to analyze a bond issue with an estate put feature from the issuer's perspective according to one embodiment of the method of the present invention, the issue is decomposed into smaller pieces and then analyzed as a portfolio. The term "bond" or "bond issue" is used broadly to cover any type of bond including stepped coupon, amortizing, and floating rate bonds. The pieces are determined by the terms of the estate put feature and the expected mortality of the corpus of holders. The expected mortality can be in the form of a vector of time-dependent death rates. In its simplest representation, it may reflect a uniform death rate.

For example, consider a $50 million 20-year bond issue callable in 4 years with an estate put provision starting after the first year. If the expected mortality rate is 1% per year and the contractual estate put limit is equal to or greater than this percentage, the bond issue is decomposed into a portfolio of 20 pieces as follows. Nineteen of the pieces will have a size of 1% of principal (i.e. $500,000) each and will be callable in or any time after the fourth year after issue. The nineteen pieces each will have a different "European" put date starting from one year from issue and continuing to the nineteenth year from issue. The twentieth piece will have a size of 81% of principal and will be callable in or any time after the fourth year from issue; it is not putable. The portfolio consisting of these bonds will be valued and analyzed using conventional bond analysis and valuation methods as they apply to callable, putable and optionless bonds. The values ascribed to the call and put options and to the cash flows of each portfolio component in aggregate will be the values of the call, estate put, and cash flows of the actual bond issue.

In order to analyze a bond issue with an estate put from the bondholder's point of view according to another embodiment of the method of the present invention, the bond is decomposed into pieces consistent in weight to the holder's expected life as represented by a mortality table.

According to another embodiment of the present invention, the method disclosed above may be applied to Certificate of Deposits (CDs) with estate put options. In practice, since most investor-held CDs are not traded in the secondary market, the holder's estate tends to put back the CD regardless of the level of interest rates. So the CD may be decomposed into a series of smaller pieces with maturities (not put exercise dates) in line with the appropriate mortality tables.

According to yet another embodiment of the present invention, a system is disclosed for determining the value of at least one bond having a nominal lifetime as determined by its maturity date, the bond having estate put and call options, the bond further having a cash flow value. The system includes a computer having a central processing unit and a computer code operatively associated with the central processing unit. The computer code includes a first set of instructions configured to decompose the bond into a plurality of pieces, the plurality of pieces equal to the number of years of the nominal lifetime of the bond. Additionally, the computer code includes a second set of instructions configured to value the estate put, call option, and cash flow of each piece based on an expected mortality rate. Further, the computer code includes a third set of instructions configured to aggregate the estate put, call option, and cash flow values of each piece to determine an aggregate value, wherein the value of the bond is equivalent to the aggregate value.

The system of the present invention may be supported by any conventional computerized device, including as examples a desktop computer, a laptop computer, a handheld or tablet computer, and/or a personal digital assistant (PDA), such as a BlackBerry® device or Palm® Pilot® device.

DETAILED DESCRIPTION OF THE PREFERRED EMBODIMENT

The present invention will now be described more fully with reference to the Figures in which the preferred embodiment of the present invention is shown. The subject matter of this disclosure may, however, be embodied in many different forms and should not be construed as being limited to the embodiment set forth herein.

With respect to FIG. 1, consider the example of a $50 million 20-year bond issue callable in or any time after four years from the date of issue with an estate put provision starting after the first year, as shown in Box 10. If the expected mortality rate is 1% per year, as shown in Box 20, and the contractual estate put limit is equal to or greater than this percentage, the bond issue is decomposed into a portfolio of 20 pieces, as shown in Box 30, as follows.

As shown in Box 40, nineteen of the pieces will have a size of 1% of principal (i.e. $500,000) each and will be callable in or any time after the fourth year after issue. The nineteen pieces each will have a different "European" put date starting from one year from issue and continuing to the nineteenth year from issue. The twentieth piece will have a size of 81% of principal and will be callable in or any time after the fourth year from issue; it is not putable.

The portfolio consisting of these bonds is valued and analyzed using conventional bond analysis and valuation methods as they apply to callable, putable and optionless bonds, as shown in Box 50.

The values ascribed to the call and put options and to the cash flows of each portfolio component in aggregate, as shown in Box 60, will be the values of the call, estate put, and cash flows of the actual bond issue, as shown in Box 70.

Many changes and modifications will occur to those skilled in the art upon studying this description. All such changes and modifications which are within the spirit of the invention are intended to be included within the scope of the claims.

What is claimed is:

1. A method of valuing at least one bond having a nominal lifetime with respect to a maturity date, said at least one bond having an estate put, said at least one bond further having a cash flow value, said method comprising the computer-implemented steps of:

providing a computer, said computer having a central processing unit and a computer code operatively associated with said central processing unit which when implemented causes a series of actions;

using said computer to divide said at least one bond into a plurality of pieces, each piece having the same maturity as the bond but having an estate put exercise date in a different year than that of any other piece in said plurality;

using said computer to value said estate put and cash flow of each said piece based on the exercisability of said estate put as determined by the expected mortality rate applicable to said piece's estate put exercise date; and using said computer to aggregate said estate put and cash flow values of each said piece to determine an aggregate value, wherein said value of said at least one bond is equivalent to said aggregate value.

2. The method of claim 1 wherein said plurality of pieces is based on said nominal lifetime of said at least one bond.

3. The method of claim 2 wherein said plurality of pieces is equal in number to the number of years of said nominal lifetime of said at least one bond.

4. The method of claim 1 wherein said plurality of pieces is based on an expected lifetime of a holder of said at least one bond.

5. The method of claim 4 wherein said expected lifetime is based on said expected mortality rate or a mortality table.

6. A system for determining the value of at least one bond having a nominal lifetime, said at least one bond having an estate put, said at least one bond further having a cash flow value, said system comprising:

a computer having a central processing unit; and a computer code operatively associated with said central processing unit, said computer code comprising:

a first set of instructions configured to divide said at least one bond into a plurality of pieces, each piece having the same maturity as the bond but having an estate put exercise date in a different year than that of any other piece in said plurality;

a second set of instructions configured to value said estate put and cash flow of each said piece based on the exercisability of said estate put as determined by the expected mortality rate applicable to said piece's estate put exercise date; and a third set of instructions configured to aggregate said estate put and cash flow values of each said piece to determine an aggregate value, wherein said value of said at least one bond is equivalent to said aggregate value.

7. The system of claim 6 wherein said plurality of pieces is based on said nominal lifetime of said at least one bond.

8. The system of claim 7 wherein said plurality of pieces is equal in number to the number of years of said nominal lifetime of said at least one bond.

9. The system of claim 6 wherein said plurality of pieces is based on an expected lifetime of a holder of said at least one bond.

10. The system of claim 9 wherein said expected lifetime is based on said expected mortality rate or a mortality table.

11. A method of valuing at least one certificate of deposit having a nominal lifetime, said at least one certificate of deposit having an estate put, said at least one certificate of deposit further having a cash flow value, said method comprising the computer-implemented steps of:
  providing a computer, said computer having a central processing unit and a computer code operatively associated with said central processing unit which when implemented causes a series of actions;
  using said computer to divide said at least one certificate of deposit into a plurality of pieces, each piece having the same maturity as the certificate of deposit but having an estate put exercise date in a different year than that of any other piece in said plurality;
  using said computer to value said estate put and cash flow of each said piece based on the exercisability of said estate put as determined by the expected mortality rate applicable to said piece's estate put exercise date; and
  using said computer to aggregate said estate put and cash flow values of each said piece to determine an aggregate value, wherein said value of said at least one certificate of deposit is equivalent to said aggregate value.

12. The method of claim 11 wherein said plurality of pieces is based on said nominal lifetime of said at least one certificate of deposit.

13. The method of claim 12 wherein said plurality of pieces is equal in number to the number of years of said nominal lifetime of said at least one certificate of deposit.

14. The method of claim 11 wherein said plurality of pieces is based on an expected lifetime of a holder of said at least one certificate of deposit.

15. The method of claim 14 wherein said expected lifetime is based on said expected mortality rate or a mortality table.

16. A system for determining the value of at least one certificate of deposit having a nominal lifetime, said at least one certificate of deposit having an estate put, said at least one certificate of deposit further having a cash flow value, said system comprising:
  a computer having a central processing unit; and
  a computer code operatively associated with said central processing unit, said computer code comprising:
    a first set of instructions configured to divide said at least one certificate of deposit into a plurality of pieces, each piece having the same maturity as the certificate of deposit but having an estate put exercise date in a different year than that of any other piece in said plurality;
    a second set of instructions configured to value said estate put and cash flow of each said piece based on the exercisability of said estate put as determined by the expected mortality rate applicable to said piece's estate put exercise date; and
    a third set of instructions configured to aggregate said estate put and cash flow values of each said piece to determine an aggregate value, wherein said value of said at least one certificate of deposit is equivalent to said aggregate value.

17. The system of claim 16 wherein said plurality of pieces is based on said nominal lifetime of said at least one certificate of deposit.

18. The system of claim 17 wherein said plurality of pieces is equal in number to the number of years of said nominal lifetime of said at least one certificate of deposit.

19. The system of claim 16 wherein said plurality of pieces is based on an expected lifetime of a holder of said at least one certificate of deposit.

20. The system of claim 19 wherein said expected lifetime is based on said expected mortality rate or a mortality table.

* * * * *